United States Patent Office.

ROBERT PAGANINI, OF BASLE, SWITZERLAND, ASSIGNOR TO THE SOCIETY OF CHEMICAL INDUSTRY, IN BASLE, OF SAME PLACE.

BLUE DISAZO DYE.

SPECIFICATION forming part of Letters Patent No. 534,573, dated February 19, 1895.

Application filed September 24, 1894. Serial No. 532,965. (Specimens.)

*To all whom it may concern:*

Be it known that I, ROBERT PAGANINI, a citizen of Switzerland, residing at Basle, Switzerland, have invented new and useful Improvements in the Production of a Disazo Coloring-Matter or Dye-Stuff, of which the following is a specification.

My invention relates to the new process for the manufacture of a disazo dye stuff dyeing violet to blue shades on unmordanted cotton in an alkaline bath or on wool and mixed goods (composed of cotton and wool) in a neutral bath containing sulfate of soda.

The new process for obtaining this coloring-matter consists in first allowing to react one molecular proportion of the tetrazo-derivatives of toluidin or dianisidin in an alkaline solution with one molecular proportion of alpha-oxy-disulfo-naphthoic acid (*König, Berichte der Deutschen Chemischen Gesellschaft*, XXII, p. 788) and in subsequently combining the thus obtained intermediate product with one molecular proportion of 1.4 alpha naphtholmono sulfonic acid.

In carrying out my invention I proceed as follows: 8.5 kilos of toluidin or 9.76 kilos of dianisidin and 30 kilos of muriatic acid, are heated together with 300 liters of water. The cooled mass is diazotized with 5.6 kilos of sodium nitrite in an aqueous solution and slowly poured into a cooled solution consisting of 16.56 kilos of the sodium salt of alpha-oxy-disulfo-naphthoic acid, 20 kilos of soda and 200 liters of water. After about one hour's rest the formation of the intermediate product is terminated.

The dye-stuff is obtained by addition of 10.8 kilos of 1.4 alpha naphthol-sulfonate of soda and is separated out from the solution by addition of common salt, filtered, pressed and dried. It is a dark brown powder of a bronze like luster, easily soluble in water with a blue-violet, in concentrated sulfuric acid with a pure blue, and in solution of caustic soda with a carmine-red coloration, but insoluble in alcohol, ether and benzene and corresponds to the formula—

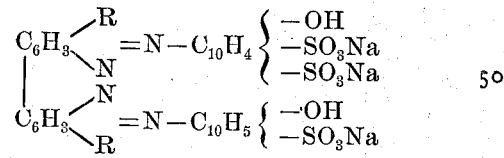

(where R signifies $CH_3$ or $OCH_3$).

The dye stuff derived from toluidin dyes violet-blue, while that derived from dianisidin dyes indigo-blue tints on unmordanted cotton and wool in a bath containing sulfate of soda.

Having thus described my invention, what I claim as new, and desire to secure by Letters Patent, is—

1. The within described process for the manufacture of a disazo dyestuff which consists in exposing an alkaline solution of alpha-oxy-disulfo-naphthoic acid to the action of a tetrazo-derivative such for example as the tetrazo derivative of toluidin and subsequently combining the resulting intermediate product with alpha naphthol mono sulfonate of soda.

2. As an article of manufacture, the coloring matter or dye stuff which can be derived from alpha-oxy-disulfo-naphthoic acid, which, when dried, is a dark brown powder with a bronze like luster, easily soluble in water with a blue-violet, in concentrated sulfuric acid with a pure blue, and in solution of caustic soda with a carmine-red coloration, but insoluble in alcohol, ether and benzene, and which corresponds to the formula—

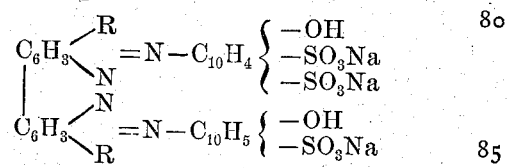

where R signifies $CH_3$ or $OCH_3$.

In testimony whereof I have hereunto set my hand in the presence of two subscribing witnesses.

ROBERT PAGANINI.

Witnesses:
F. E. CROWE,
GEORGE GIFFORD.